(12) United States Patent
Gieshoff et al.

(10) Patent No.: US 6,517,794 B2
(45) Date of Patent: Feb. 11, 2003

(54) METHOD FOR REMOVING NITROGEN OXIDES FROM AN OXYGEN-CONTAINING FLUE GAS STREAM

(75) Inventors: Jürgen Gieshoff, Biebergemünd (DE); Jürgen Lang, Kirchheim-Teck (DE)

(73) Assignee: DMC² Degussa Metals Catalysts Cerdec AG, Frankfurt am Main (DE)

( * ) Notice: Subject to any disclaimer, the term of this patent is extended or adjusted under 35 U.S.C. 154(b) by 106 days.

(21) Appl. No.: 09/842,321

(22) Filed: Apr. 26, 2001

(65) Prior Publication Data

US 2001/0038813 A1 Nov. 8, 2001

(30) Foreign Application Priority Data

Apr. 29, 2000 (DE) ......................................... 100 21 071

(51) Int. Cl.⁷ ............................................... B01D 53/56
(52) U.S. Cl. ................. 423/239.1; 204/157.3; 204/157.46; 204/179; 423/352
(58) Field of Search .................. 204/157.3, 157.46, 204/179; 423/235, 239.1, 352

(56) References Cited

U.S. PATENT DOCUMENTS 5,715,677 A 2/1998 Wallman et al. ............... 60/274
6,038,853 A * 3/2000 Penetrante et al. ........... 60/274
6,238,525 B1 * 5/2001 Lox et al. .................... 204/177

FOREIGN PATENT DOCUMENTS

| DE | 19819372 A1 | 11/1999 |
| DE | 198 19 372 | 11/1999 |
| EP | 0367025 B1 | 8/1993 |
| EP | 0385164 B1 | 10/1993 |

OTHER PUBLICATIONS

European Search Report for counterpart application No. EP 01 10 8592, dated Jul. 13, 2001.

* cited by examiner

*Primary Examiner*—Stanley S. Silverman
*Assistant Examiner*—Marible Medina
(74) *Attorney, Agent, or Firm*—Kalow & Springut LLP

(57) ABSTRACT

A method for removing nitrogen oxides from a lean flue gas. The method is carried out by:
 a) treating the flue gas in an electrical gas discharge,
 b) passing the thus treated flue gas over a basic storage material to store the nitrogen oxides in the form of nitrates and release of the treated flue gas to the environment, and
 c) regeneration of the storage material after depletion of its storage capacity by removing the storage material from the flue gas stream and treating it was a reducing regenerative gas stream while forming ammonia.

13 Claims, 3 Drawing Sheets

METHOD FOR REMOVING NITROGEN OXIDES FROM AN OXYGEN-CONTAINING FLUE GAS STREAM

INTRODUCTION AND BACKGROUND

The present invention relates to a method for removing nitrogen oxides from oxygen-containing flue gas steams of industrial combustion processes.

Nitrogen oxides that arise in combustion processes are among the primary causes of acid rain and the related environmental damage. Primary sources of the release of nitrogen oxides into the environment are the exhaust gases of motor vehicles and the flue gases of combustion plants, especially oil-, gas- or coal-fired power plants or stationary combustion engines as well as industrial operations. The nitrogen oxides contained in the exhaust gases consist of up to 60 to 90 vol % nitrogen monoxide, in each case according to the completeness of the combustion process.

One characteristic of the flue gases from these processes is their relatively high oxygen content, which impedes the reduction of the nitrogen oxides contained in them. The excess air coefficient lambda($\lambda$) is frequently used to characterize the oxygen content. This is the air/fuel ratio of the combustion process normalized to stoichiometric ratios. In the case of stoichiometric combustion the excess air coefficient is equal to one. In the case of superstoichiometric combustion the excess air coefficient is greater than 1—the resulting exhaust gas is lean. In the opposite case one speaks of a rich exhaust gas.

A method that has long been used to remove nitrogen oxides from such flue gases is the so-called selective catalytic reduction (SCR) with ammonia on a specially designed reduction catalyst. Suitable catalysts for this are, for example, described in the patents EP 0367025 B1 and EP 0385164 B1. They consist, for example, of a mixture of titanium oxide with oxides of tungsten, silicon, vanadium, and others. Likewise known are catalysts based on zeolites exchanged with cooper and iron. These catalysts develop their optimum activity at temperatures between 300 and 500° C. and a mol ratio between the reducing agent ammonia and the nitrogen oxides from 1.6 to 0.6.

Because of the frequently very high sulfur content of the flue gas that is to be treated there is the danger of poisoning of the catalysts by sulfur. For this reason a flue gas desulfurization plant is frequently connected ahead of the catalytic reduction, although it is operated at temperatures under 300° C., so that the flue gas has to be again raised to the operating temperature of the nitrogen removal catalyst before selective catalytic reduction.

An object of this invention is to provide an alternate method for removal of nitrogen oxides from flue gases that additionally enables the production of ammonia as product of value, with simultaneously improved efficiency.

SUMMARY OF THE INVENTION

The above and other objects of the invention can be achieved by a method that comprises:

a) treating the flue gas in an electrical gas discharge, b) passing the thus treated flue gas over a basic storage material for storage of nitrogen oxides in the form of nitrates and discharge of the treated flue gas to the environment, and c) regeneration of the storage material after its storage capacity has been depleted, by removing the storage material from the flue gas stream and treating it with a reducing regenerative gas stream while forming ammonia.

This invention carries forward from the method disclosed in DE 198 19 372 A1 for reducing the nitrogen oxide content of the exhaust gas of an internal combustion engine. In accordance with this method, the lean exhaust gas of a superstoichimetrically operated combustion engine is passed through an electrical gas discharge plasma. The electrical gas discharge plasma is generated in a so-called plasma reactor. Oxidation of the nitrogen monoxide to nitrogen dioxide takes place in the gas discharge plasma and, employing the water content of the waste gas, nitric acid also forms there. Nitrogen dioxide and nitric acid are chemically bonded in the form of nitrates by a basic storage material and thus removed from the exhaust gas stream.

After depletion of the storage capacity of the storage material, the stored nitrogen oxides, in accordance with DE 198 19 372 A1, are broken down to nitrogen oxides by treating them with a rich exhaust gas and then reduced to nitrogen on a catalyst, where the hydrocarbons contained in the rich exhaust gas are employed as reducing agent for the nitrates. The storage material that is regenerated in this way can be reused for storage of nitrogen oxides in the form of nitrates.

The oxides of alkali and alkaline earth materials, for example, are suitable as a basic storage material, but rare earth oxides can also be used, especially cerium oxide and lanthanum oxide. These materials could be used directly. However, they are preferably deposited in a finely divided form onto high-surface-area carrier materials such as activated aluminum oxide in order to make available an area for interaction with the exhaust gas that is as large as possible.

It was now found that in the regeneration of the storage material with a very rich gas mixture the released nitrogen oxides can be reduced to ammonia. For this the lambda values of the gas stream that is used for regeneration must be under 0.8. In contrast, with the usual regeneration with lambda values between 0.9 and 1.0, only a release of the stored nitrates in the form of nitrogen oxides is achieved.

The storage material for storage of the nitrogen dioxide formed in a plasma reactor, or the nitric acid, can be arranged in the plasma reactor itself or in an absorption vessel situated in the direction of flow of the flue gas beyond the plasma reactor. If the storage material is arranged in the gas discharge, the process steps (a) and (b) run parallel with each other. The gas discharge and storage material can also be arranged in succession in the direction of flow of the flue gas in a single reactor.

In accordance with the invention the storage material is continuously removed from the flue gas stream and sent to a separate station for regeneration of its storage capacity. In this separate station the storage material is regenerated by treatment with a rich gas stream. The regeneration is conducted so that the stored nitrates are released in the form of ammonia. The rich gas stream has to have an excess air coefficient under 0.8 for this purpose. It can be generated in a simple way by a substoichiometrically operated combustion.

The regenerated storage material can either be sent back to the plasma reactor or to the absorption vessel, while the released ammonia is separated from the gas stream used for regeneration by condensation and recovered as a product of value.

In a preferred embodiment of the method, sulfur compounds are separated from the flue gas in a flue gas desulfurization plant before the gas goes to the electrical gas discharge. Since the method separates the nitrogen oxide from the flue gas without using a step for selective catalytic reduction of nitrogen oxides, it is also not necessary to raise the temperature of the flue as back to the operating temperature of the selected catalytic reduction after the gas passes through the flue gas desulfurization unit. The formation of nitrogen dioxide and nitric acid in the gas discharge as well as the storage in the form of nitrates on storage material takes place even at the input temperatures of the flue gas desulfurization plant. Because it is no longer necessary to reheat the flue gas, the efficiency of a power plant, for example, is improved.

In another embodiment of the method, it is combined with a conventional SCR process. The ammonia obtained with the method is then used for selective catalytic reduction of the nitrogen oxides contained in another flue gas stream. In this embodiment of the method, thus the flue gas stream of the power plant is divided into at least two partial streams. One partial stream is purified as given by steps (a) through (c), while the second is passed over a catalyst for selective catalytic reduction. At least in part the ammonia released in step (c) is used as the reducing agent.

BRIEF DESCRIPTION OF THE DRAWINGS

The present invention will be further understand with reference to the drawings, wherein.

DETAILED DESCRIPTION OF INVENTION

Various gas discharges can be used to treat the exhaust gases. High frequency discharges, even with frequencies above 250 MHz (microwave discharges), corona discharges and the dielectrically constrained discharge, also called barrier discharge, are suitable. Likewise suitable are mixed forms of these electrical gas discharges. Barrier discharges are preferably used for the proposed method.

A barrier discharge can be generated between two metal electrodes, of which at least one is coated with a dielectric material, which prevents sparking and arcing between the two metal electrodes. Instead, a large number of brief and spatially quite restricted microdischarges form, and their discharge duration and energy are limited by the dielectric material. Suitable dielectrics are ceramics, glass, porcelain or insulating plastics such as Teflon. Other suitable materials are described in VDE 0303 and DIN 40685.

Barrier discharges can be operated at pressures between 0.1 and 10 bar. The electrical excitation of the discharge takes place by applying alternating current to the electrodes. In each case according to the pressure in the discharge space, the spacing of the electrodes, the frequency and the amplitude of the alternating current, sparse, spatially and temporally statistically distributed discharge channels of only a few nanoseconds duration form when a striking voltage is exceeded.

Figure 1:
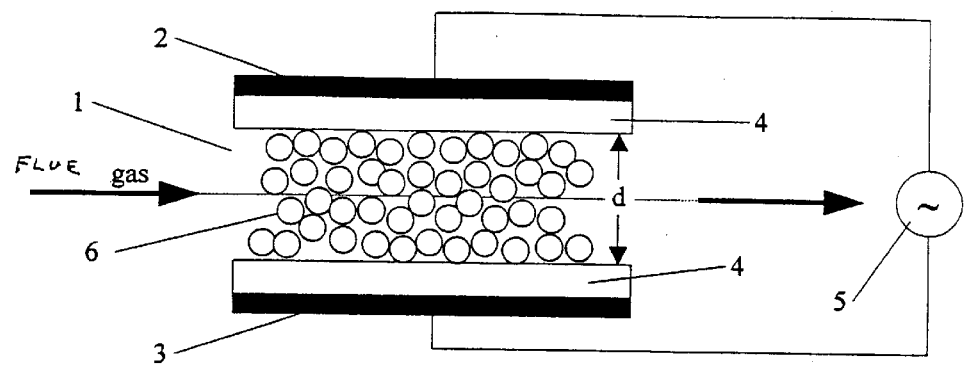
FIG. 1 is a schematic representation of a plasma reactor with bilaterally constrained dielectric discharge between two parallel flat electrodes and a filling of pelletized storage material.

FIG. 1 shows the principle structure of plasma reactor in which a dielectric barrier discharge can be initiated. (2) and (3) are two metal electrodes, which are opposite to another and are joined by an alternating source (5). To suppress the formation of a discharge arc between the two electrodes they are both coated with a dielectric (4). Such a discharge is characterized as bilaterally dielectrically constrained. However, there is also the possibility of just coating one of the electrodes with a dielectric material. In this case a unilaterally dielectrically constrained gas discharge results.

By applying alternating voltage to the two electrodes the desired discharge occurs if the voltage is sufficient. The required voltage is dependent on the free distance d between the dielectric and the counterelectrode, on the dielectric that is used and on the pressure in the discharge path, on the gas composition and on structures that may be present between the dielectrics in the discharge space. The distance d is preferably set between 0.1 and 10 mm. The necessary voltages can be 15 kV and higher. The frequency of the alternating voltage is preferably between 50 Hz and 250 MHz.

The plasma reactor in FIG. 1 is, to conduct the method in accordance with claim 2, filled with pellets (16) that consists of a storage material for the nitrogen oxides. This arrangement is particularly suitable for conducting the method. The electrical discharge that is produced in the pellet-filled reactor takes place above all in the form of sliding discharges on the surface of the pellets. Through this the concentration of ions and radicals in the spatial vicinity of the surface is increased, which leads to improved storage of the nitrogen oxides in the form of nitrates.

The pellets preferably consist of at least one finely divided support material selected from the group consisting of aluminum oxide, titanium oxide, zirconium oxide, cerium oxide, silicon dioxide, magnesium oxide or their mixed oxides and zeolites. The support materials are coated with the storage components in a known way. In addition, they can be catalytically activated by deposition noble metals of the platinum group, especially platinum, palladium, rhodium and iridium, in a finely divided form on their surface. For this purpose the specific surface of the support materials should be at least 10 $m^2/g$ (measured in accordance with DIN 66132). Because of the low temperature load, it is also possible to use materials with lower temperature resistance.

In addition to the pellets or alternatively, the dielectric on the electrode surface can be provided with a catalytically active layer. Its composition can correspond to the composition for the storage pellets that was just described. In certain applications the dielectric can be formed as a catalytically active layer on the electrode surfaces themselves. A prerequisite for this is that the insulating effect of the layer satisfy the requirements of a dielectrically constrained discharge.

The electrodes of the plasma reactor can be mounted as flat structures oriented parallel to each other or can form a coaxial arrangement with central electrode surrounded by a tubular electrode. To facilitate the formation of discharge filaments spatial inhomogeneities can be provided, which lead to local field elevations and thus to development of the discharge. As is known from the literature, the coupled electron energy in a plasma discharge is dependent on the product of the electrode spacing d and the pressure p (d·p), so that for a constant gas pressure certain radical reactions in the plasma can be promoted or suppressed just by changing the geometry of the reactor. For the proposed method the product of the electrode spacing and pressure should lie in the range between 0.1 and 100 mm·bar.

The discharge can be initiated by various kinds of alternating voltages. For a high electron density and, as far as possible, simultaneous development of the discharge over the entire discharge space of the reactor, pulsed excitation voltages are particularly suitable. These alternating voltages can be modulated down to low frequencies (10 to 0.01 Hz) in order to enable, for example, the reaction of adsorbed species.

The reactor can be made of any electrically and thermally suitable material. In particular, plastics, ceramics and glasses may be mentioned. Hybrid constructions of different materials are also possible.

Figure 2:
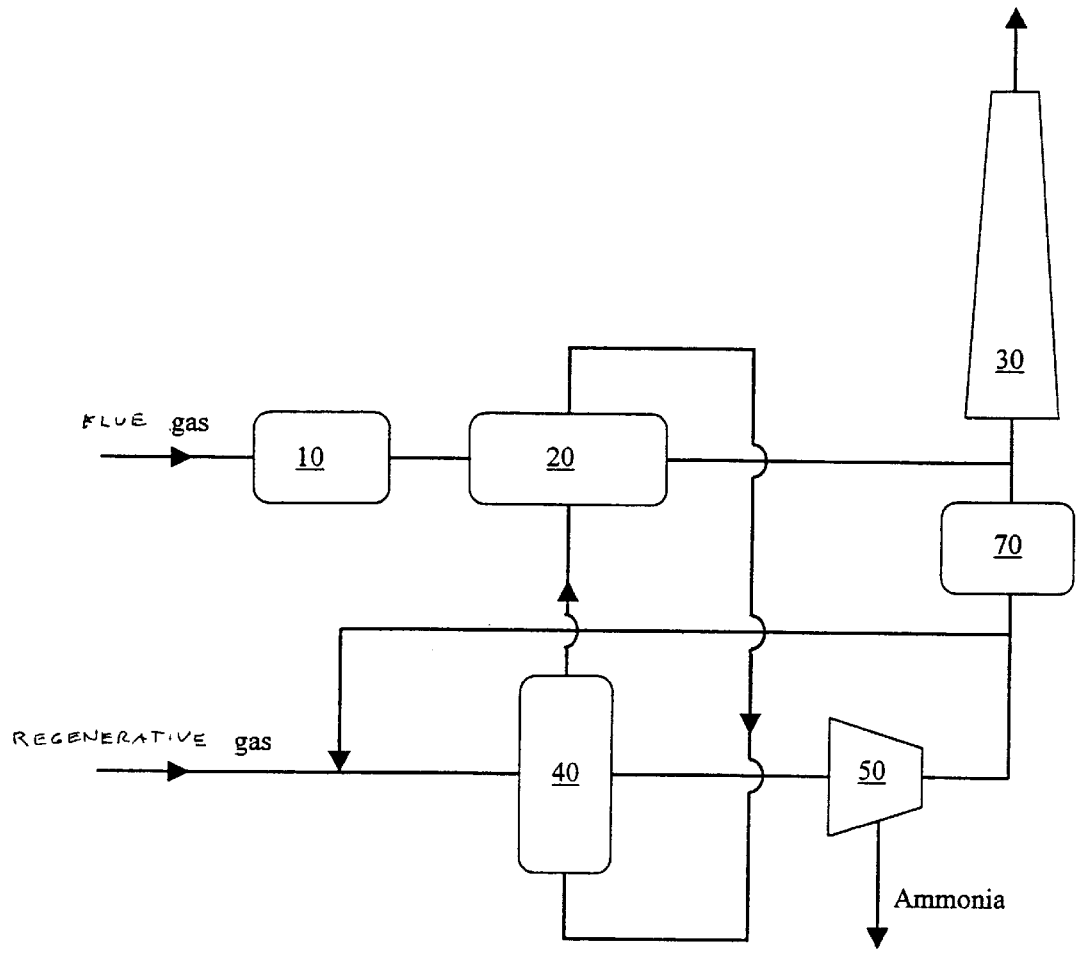
FIG. 2 is a flow diagram illustrating the method in accordance with the invention with circulation of the regenerative gas stream.
Figure 3:
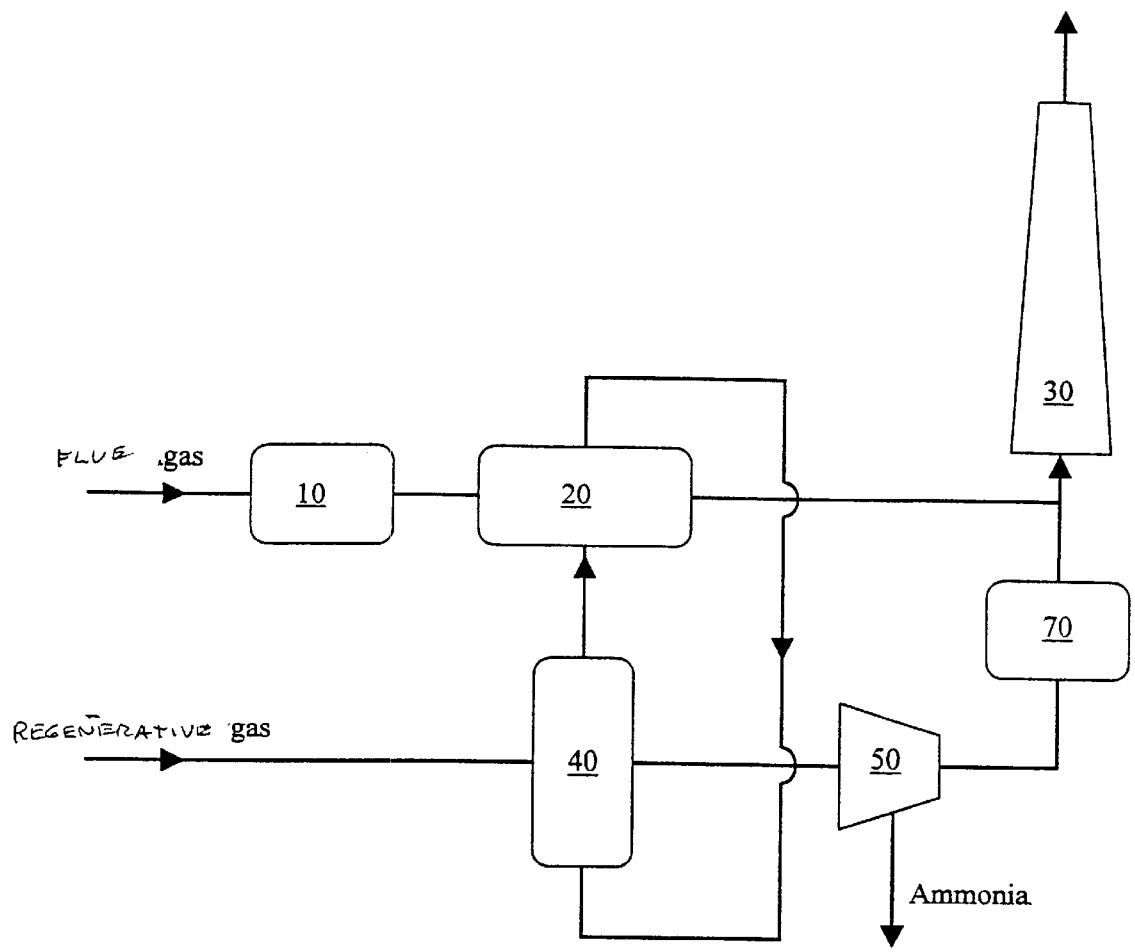
FIG. 3 is a flow diagram illustrating the method in accordance with the invention with release of the regenerative gas stream to the environment after the regenerative gas stream has been subjected to a post-combustion.

FIGS. 2 and 3 show a flow diagram for the method for purification of the flue gas of a power plant. The flue gas is, after desulfurization in the sulfurization plant (10), passed through the plasma reactor (20), which is filled with pelletized storage material. Because of the storage material arranged in the gas discharge the nitrogen oxides are removed from the glue gas stream by absorption and the flue gas stream can then be released into the environment via the smoke stack (30). The storage capacity of the storage material continually decreases because of the loading with the nitrogen oxides. For regeneration the storage material is thus likewise continuously discharged from the plasma reactor and regenerated in the regenerator reactor (40) by passing a reducing regenerative gas over it, with the formation of ammonia. The regenerated storage material is returned to the plasma reactor for recharging with nitrogen oxide. The ammonia is removed in the separation unit (50), for example by condensation from the regenerative gas stream, and processed further as a valuable product. The regenerative gas stream from which ammonia has been removed can, after treatment in a post-combustion unit (70) likewise be released into the environment via the smoke stack (30) (see FIG. 3). However, preferably a part of the regenerative gas stream is circulated (see FIG. 2).

Figure 4:
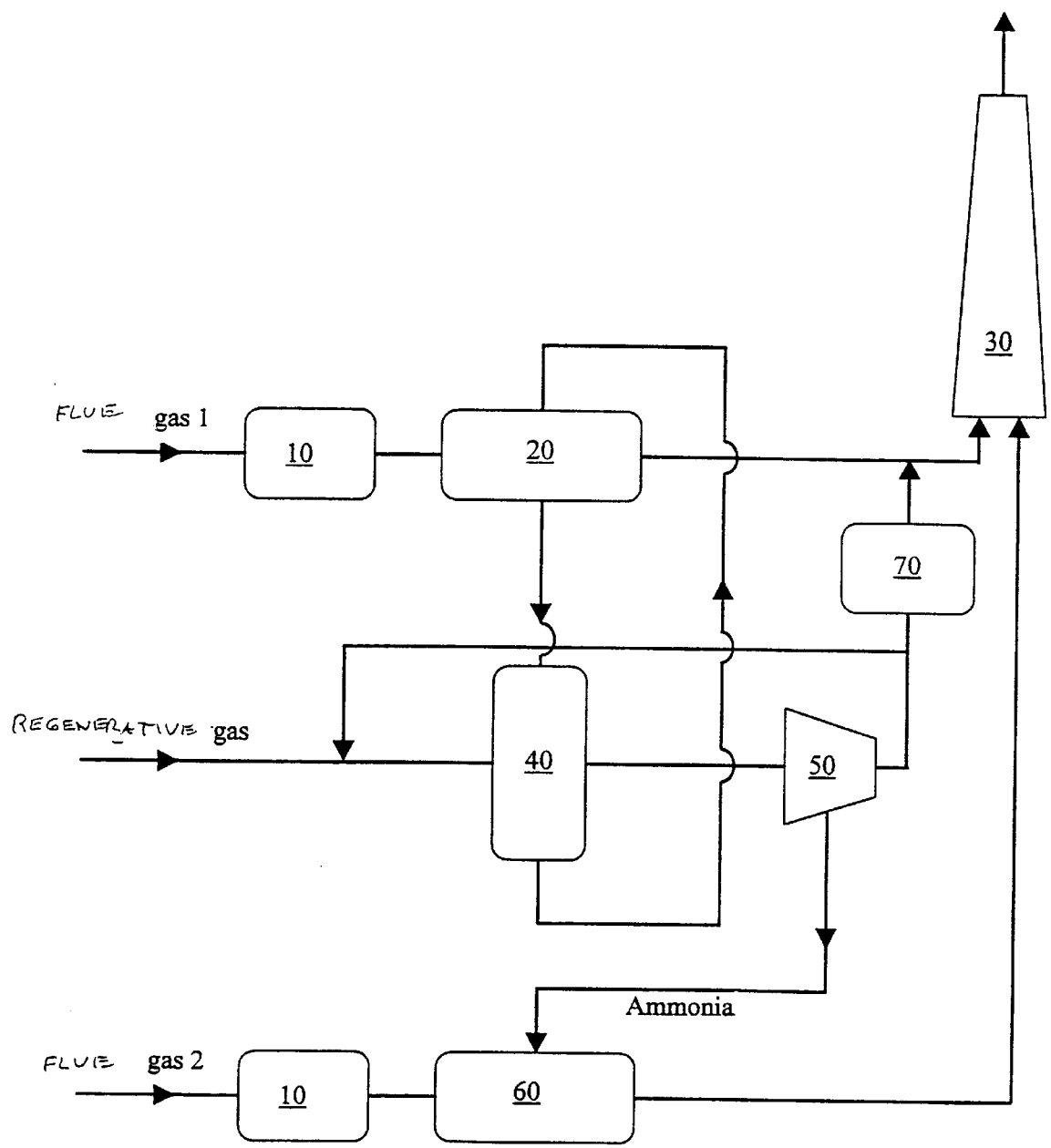
FIG. 4 is a flow diagram illustrating the method in accordance with the invention using the recovered ammonia as reducing agent for the selective catalytic reduction of another flue gas stream.

FIG. 4 shows a flow diagram for the method in accordance with claim 7. Compared to the scheme in FIG. 3, it is enlarged by a second flue gas stream. The second flue gas stream is likewise desulfurized in a desulfirization unit (10). Then the nitrogen oxides contained in it are reduced to nitrogen on an appropriate catalyst in a reactor (60) for selective catalytic reduction before the purified flue gas is released to the environment through the smoke stack. The ammonia obtained in the regeneration of a storage material is used as reducing agent for the selective catalytic reduction.

Further variations and modifications of the foregoing will be apparent to those skilled in the art and are intended to be encompassed by the claims appended hereto.

German priority application 100 21 071.6 is relied on and incorporated herein by reference.

We claim:

1. A method for removing nitrogen oxides from an oxygen-containing flue gas stream, comprising:
   a) treating the flue gas in an electrical gas discharge,
   b) passing the thus treated flue gas over a basic storage material to store the nitrogen oxides in the form of nitrates and release the treated flue gas to the environment, and
   c) regeneration of the storage material after depletion of its storage capacity by removing the storage material from the flue gas stream and treating it with a reducing regenerative gas stream while forming ammonia.

2. The method as in claim 1, wherein (a) and (b) are run in parallel through arrangement of the storage material in said gas discharge.

3. The method as in claim 1, wherein said gas discharge and storage material are arranged successively in a single reactor.

4. The method as in claim 1, further comprising removing sulfur compounds from the flue gas before it enters the gas discharge.

5. The method as in claim 4, further comprising returning material to the process.

6. The method as in claim 5, which further comprising condensing the ammonia generated in (c) and recovering same.

7. The method as in claim 6, further comprising introducing the ammonia generated in (c) for selective catalytic reduction of another flue gas stream.

8. The method as in claim 1, wherein the regenerative gas stream contains carbon monoxide and steam and is recovered by a substoichiometrically operated combustion process.

9. The method as in claim 1, further comprising circulating the regenerative gas stream.

10. The method as in claim 1, further comprising subjecting the regenerative gas stream to a post-combustion before being released into the environment.

11. The method as in claim 1, wherein said gas discharge is operated in pulsed or modulated fashion.

12. The method as in claim 1, wherein the product of the electrode spacing and the gas pressure is between 0.1 and 100 mm·bar.

13. The method as in claim 1, wherein said gas discharge is conducted as a surface sliding discharge.

\* \* \* \* \*